United States Patent [19]

Kodama et al.

[11] Patent Number: 5,212,989

[45] Date of Patent: May 25, 1993

[54] PRESSURE SENSOR

[75] Inventors: Seiki Kodama; Atsushi Ueda; Toshio Iwata; Yasuo Tada; Tateki Mitani; Yasuyoshi Hatazawa, all of Himeji; Mikio Bessho; Yuji Hase, both of Amagasaki, all of Japan

[73] Assignee: Mitsubishi Denki K.K., Tokyo, Japan

[21] Appl. No.: 710,987

[22] Filed: Jun. 6, 1991

[30] Foreign Application Priority Data

| Jun. 8, 1990 | [JP] | Japan | 2-60162[U] |
| Jun. 8, 1990 | [JP] | Japan | 2-60163[U] |
| Jun. 11, 1990 | [JP] | Japan | 2-149839 |
| Jun. 15, 1990 | [JP] | Japan | 2-62742[U] |
| Jun. 15, 1990 | [JP] | Japan | 2-62743[U] |
| Sep. 25, 1990 | [JP] | Japan | 2-251898 |
| Sep. 26, 1990 | [JP] | Japan | 2-254112 |

[51] Int. Cl.$^5$ .......................... G01L 7/08; G01L 9/06; G01L 19/04

[52] U.S. Cl. .................... 73/706; 73/708; 73/727; 73/756; 338/4

[58] Field of Search ............... 73/706, 708, 720, 721, 73/726, 727, 753, 754, 756, DIG. 4; 338/4

[56] References Cited

U.S. PATENT DOCUMENTS

| 4,586,018 | 4/1986 | Bettman | 338/42 |
| 4,675,643 | 6/1987 | Tanner et al. | 338/4 |
| 4,819,487 | 4/1989 | Wareham | 73/706 |
| 5,012,677 | 5/1991 | Shimada et al. | 73/721 |

OTHER PUBLICATIONS

U.S. Ser. No. 07/683,632, filed Apr. 11, 1991; assigned to GAU: 2611.
U.S. Ser. No. 07/798,588, filed Nov. 26, 1991; assigned to GAU: 2611.

*Primary Examiner*—Donald O. Woodiel
*Attorney, Agent, or Firm*—Sughrue, Mion, Zinn, Macpeak & Seas

[57] ABSTRACT

A pressure sensor comprising a hollow main body (11) defining a bore (14) extending therethrough and having a detection end and an output end. A pressure sensing assembly is disposed within said bore (14) to divide it into a detection cavity (17) and an output cavity (18) through which output signal lines from said pressure sensing assembly extend. A flexible diaphragm (19) is attached to the detection end of the bore to define a sealed detection cavity (17) in which a pressure transmitting liquid is filled. The pressure sensing assembly comprises support plate (24) welded to said main body (11) and supporting a pressure sensing element (26) within said detection cavity (17) through a mounting bed (4). The signal lines sealingly extend through said support plate (24) from said detection cavity (17) to said output cavity (18).

9 Claims, 3 Drawing Sheets

PRESSURE SENSOR

BACKGROUND OF THE INVENTION

This invention relates to a pressure sensor and, more particularly, to a pressure sensor for use in an automotive internal combustion engine in which a pressure transmitting liquid is filled between a pressure detection assembly and a flexible diaphragm.

FIG. 5 illustrates one example of a conventional pressure sensor for use in detecting gas pressure within a combustion chamber of an internal combustion engine. In FIG. 5, reference numeral 1 designates a stainless steel case to be attached to an engine (not shown), 2 designates a diaphragm attached to an inner or lower end of the case 1, 3 designates an electrically insulating base, 4 designates a mounting bed made of a ceramic material and welded to the case 1, and 5 designates a pressure sensing element bonded to the mounting bed 4. The pressure sensing element 5 is a silicon semiconductor strain gauge. A pressure transmitting liquid of silicone oil 10 having a high boiling point is filled between the pressure sensing element 5 and the flexible diaphragm 2.

Reference numeral 6 designates terminals attached to the base 3, 7 designates bonding wires connecting the terminals 6 to the pressure sensing element 5, 8 designates a plug thread-engaged with the case 1, and 9 designates output lines extending through the plug 8 and connected at one end to the terminals 6.

The pressure increase within the combustion chamber causes the diaphragm 2 to flex upward in FIG. 5 and the pressure of the silicone oil 10 is increased, which in turn is sensed by the pressure sensing element 5. Then the pressure sensing element 5 generates an electrical signal indicative of the pressure change and supplies it through the bonding wires 7, the terminals 6 and the output lines 9 to an unillustrated external circuit for controlling the ignition timing of the ignition plug in accordance with the combustion conditions within the combustion chamber.

During assembly of the conventional pressure sensor as described above, the base 3 on which the terminals 6 are attached and the mounting bed 4 on which the pressure sensing element 5 is bonded are securely attached to the inner surfaces of the substantially cup-shaped case 1. Thereafter, the pressure sensing element 5 and the terminals 6 are wire-bonded within the cup-shaped casing 1 to electrically connect them by the bonding wires 7. Therefore, the wire-bonding operation must be carried out within the relatively narrow and hard-to-access space defined in the case 1, making the assembling operation efficiency relatively poor.

Also, since the mounting bed 4 supporting the pressure sensing element 5 is welded to the case 1, the welding heat applied during the assembly causes the mounting bed 4 to distort and deform, which results in an undesirable effect on the pressure sensing element 5 which may result in detection errors.

Further, the pressure sensing element 5 in the conventional pressure sensor is subjected to an extremely large temperature difference such as 800° C. between two major surfaces. During operation of the engine, the pressure sensing element 5 may be heated to an elevated temperature at a pressure receiving surface at which the high-temperature slicone oil 10 is in contact with the element 5, and the opposite major surface of the element 5 facing to the atmosphere is kept at a relatively low temperature. Therefore, it was very difficult to compensate for the temperature difference of the pressure sensing element 5.

Also, since the flexible diaphragm 2 is securely attached at its circumferential edge to the lower end or relatively sharp edge of the case 1, the diaphragm 2 is always and repeatedly bent at the same circumferential edge supported by the case 1 with a small radius of curvature when the diaphragm 2 flexes due to pressure. Therefore, the diaphragm is subjected to repeated bending and could finally be raptured.

Further, since the internal volume of a detection cavity in which the pressure transmitting silicone oil 10 is filled is relatively large, a large amount of the silicone oil 10 is needed and a thermal expansion of the oil 10 is large, so that the error in pressure sensing is generated. Thus, it is desired that the internal volume of the detection cavity can be significantly reduced by a simple measure. Also, it is desired that a measure for compensating for the thermal expansion of the pressure transmitting liquid within the detection cavity be provided for an improved accuracy of the pressure sensing.

The pressure transmitting oil 10 is sealingly filled within the detection cavity, but a pressure is often generated in the oil and it is impossible to relieve this pressure once the sensor is assembled. The pressure in the pressure transmitting oil 10 results in a bias in the flexible diaphragm 2.

SUMMARY OF THE INVENTION

Accordingly, one object of the present invention is to provide a pressure sensor free from the above-discussed problems of the conventional pressure sensor.

Another object of the present invention is to provide a pressure sensor having an improved assembling operation efficiency.

Another object of the present invention is to provide a pressure sensor in which the pressure sensing element is less sensitive to the thermal distortion of the mounting bed.

Still another object of the present invention is to provide a pressure sensor in which the temperature compensation is easy.

Another object of the present invention is to provide a pressure sensor in which the temperature compensation is facilitated and the sensing accuracy is high.

A further object of the present invention is to provide a pressure sensor in which the flexible diaphragm lasts for a long period of time and which has a long operating lifetime.

A further object of the present invention is to provide a pressure sensor in which only a small amount of pressure transmitting oil is needed and which has an increased sensing accuracy.

Another object of the present invention is to provide a pressure sensor in which the thermal expansion of the pressure transmitting liquid within the detection cavity can be compensated for.

Another object of the present invention is to provide a pressure sensor in which the pressure of the pressure transmitting liquid can be adjusted.

With the above objects in view, the pressure sensor of the present invention comprises a hollow main body defining a bore extending therethrough and having a detection end and an output end. A pressure sensing assembly is disposed within the bore of the main body and dividing the bore into a detection cavity for transmitting pressure to be detected by the pressure sensing assembly therethrough and an output cavity through which an output signal from the pressure sensing assembly is supplied. The pressure sensor also comprises a flexible diaphragm attached to the main body at the detection end of the bore for sealing the detection cavity, and a pressure transmitting medium filled within the detection cavity. The pressure sensing assembly comprises a support unit which may comprise a mounting bed sealingly attached to the main body, a pressure sensing element operatively attached to the support unit and disposed within the detection cavity of the main body and a signal line connected to the pressure sensing element and sealingly extending through the support unit from the detecting cavity to the outputting cavity.

The pressure sensing element may be disposed within the pressure transmitting medium, and the pressure sensing element may have a bonded surface at which the pressure sensing element is hermetically bonded to the support unit and a pressure receiving surface positioned opposite to the support unit. The mounting bed may have a volume sufficient to effectively decrease the volume of the detection cavity to be filled with the pressure transmitting medium. The detection cavity may have a first chamber for receiving therein the pressure sensing assembly, a second chamber for allowing flexture of the flexible diaphragm in response to pressure acting thereupon, and a reduced diameter passage fluid communicating the first and second chambers.

Alternatively, the detection end of the bore, along which the flexible diaphragm is bent when the latter is subjected to a pressure, may have a bevelled edge surface for moderating concentration of bending of the diaphragm. The detection cavity is provided with a spacer for decreasing the volume of the detection cavity such as a tube or a thermally-contracting material having a negative coefficient of thermal expansion such as iron-platinum alloy for absorbing thermal expansion of the pressure transmitting medium.

In order to adjustably change the volume of the detection cavity after assembly, the main body has attached thereto a volume adjuster, which may comprise a threaded hole formed in a main body and communicating with the detecting cavity and an adjusting screw thread-engaged with the threaded hole, the adjusting screw changing the axial position thereof in the threaded hole when turned.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
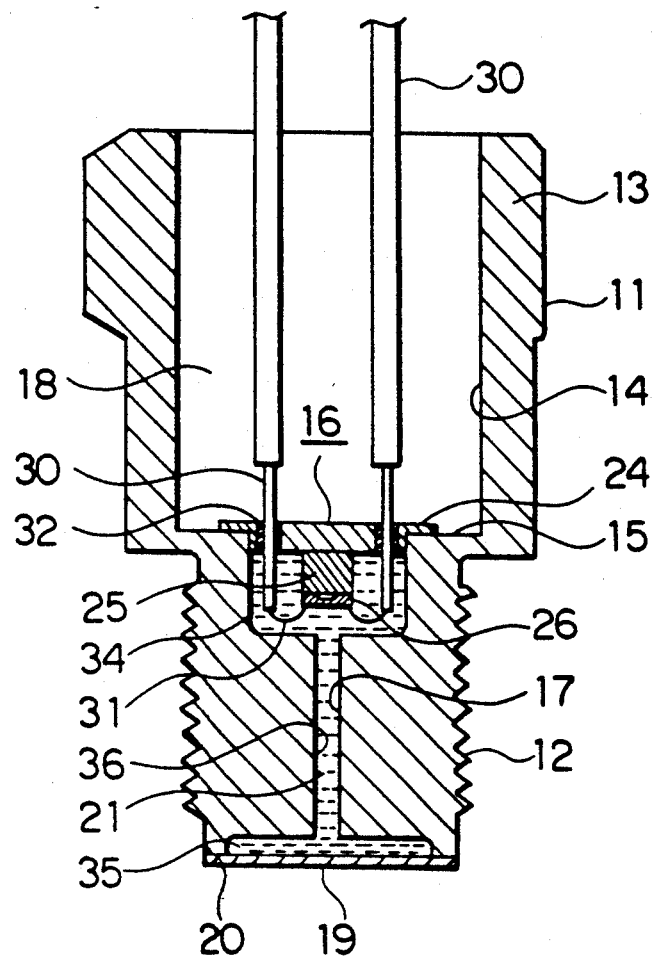
FIG. 1 is a longitudinal sectional view of an embodiment of the pressure sensor of the present invention.

FIG. 1 illustrates a pressure sensor of the present invention, which comprises a generally cylindrical hollow metallic main body 11 having a threaded inner portion 12 and a substantially cup-shaped outer portion 13. The main body 11 has formed therein a central bore 14 extending through the entire length of the main body 11. The central bore 14 has a shoulder portion 15 at the middle portion thereof on which a pressure sensing assembly 16 is hermetically attached. The pressure sensing assembly 16 divides the central bore 14 into a detection cavity 17 for transmitting therethrough a pressure within the engine (not shown) to the pressure sensing assembly 16 and an output cavity 18 through which an output signal from the pressure sensing assembly 16 is supplied to an external circuit (not shown). The pressure sensor also comprises a flexible diaphragm 19 attached to the main body 11 at a detection end 20 of the detection cavity 17 for sealing the detection cavity 17 which is filled with a pressure transmitting medium 21 of a suitable liquid such as silicone oil.

According to the present invention, the pressure sensing assembly 16 comprises a support plate member 24 made of carbon steel sealingly attached to the shoulder portion 15 of the main body 11 such as by welding. A ceramic mounting bed 25 is attached to the plate member 24 and a semiconductor pressure sensing element 26 is attached to the mounting bed 25. As seen from FIG. 2, the pressure sensing element 26 is attached on the support plate 24 on the detection cavity side and therefore disposed within the detection cavity 17 and surrounded by the pressure transmitting medium 21. Therefore, pressure sensing element 26 is not directly exposed to the atmospheric air temperature which is very unstable, so that the pressure sensing element is not affected by the ambient air temperature and the temperature compensation of the pressure sensor is easy. The pressure sensing element 26 has a bonded surface 27 at which the pressure sensing element 26 is hermetically bonded to the ceramic mounting bed 25 and a pressure receiving surface 28 in contact with the pressure transmitting medium 21. The bonded surface 27 has an evacuated recess 29 at the central portion of the bonded surface 27 so that the pressure sensing element 26 may flex in response to the pressure applied on the pressure receiving surface 28. Relatively rigid electrical signal lines 30 are connected to the pressure sensing element 26 through bonding wire 31 and extend through the support plate member 24 from the detection cavity 17 to the output cavity 18. The signal lines 30 are sealed to the support plate member 24 by suitable sealants 32.

During manufacture of the pressure sensor, the pressure sensing assembly 16 can be assembled as one unit outside of the main body 11 and attached within the main body 11 at the support plate member 24 by welding for example. That is, the pressure sensing assembly 16 is manufactured by attaching the semiconductor pressure sensing element 26 to the mounting bed 25 which in turn is attached to the support plate member 24, and firmly connecting the rigid output signal lines 30 to the plate member 24 by the sealant 32 so that their inner ends are positioned close to the pressure sensing element 26, and then connecting the bonding wires 31 between the pressure sensing element 26 and the output signal lines 30, whereby the pressure sensing assembly 16 as an independent unit is assembled. This pressure sensing assembly 16 thus manufactured can be easily installed and attaced within the cup-shaped outer portion 13 of the main body 11 by a weld (not shown) between the support plate member 24 and the shoulder portion 15 of the main body 11. Therefore, the wire bonding operation can be performed outside of the main body 11.

The pressure sensing element 26 is made for example of a silicon semiconductor (coefficient of thermal expansion: $4\times10^{-6}$) and is supported on the mounting bed 25 made of ceramic (coefficient of thermal expansion: $8\times10^{-6}$). The mounting bed 25 is attached to the main body 11 made of stainless steel (coefficient of thermal expansion: $16.4\times10^{-6}$) through the support plate member 24 made of carbon steel (coefficient of thermal expansion: $11\times10^{-6}$). Therefore, the distorsion or the deformation of the ceramic mounting bed 25 which would undesirably stress the pressure sensing element 26 by the heat applied during the welding operatin or engine operation, is significantly reduced.

In the embodiment illustrated in FIG. 1, the detection cavity 17 comprises a first chamber 34 for accomodating therein the pressure sensing assembly 16, a second chamber 35 for allowing flexture of the flexible diaphragm 19 in response to a pressure of the combustion chamber of an internal combustion engine (not shown), and a relatively narrow, reduced-diameter passage 36 fluid communicating the first and the second chambers 34 and 35. The inner diameter of the passage 36 may be as small as 1 mm. The semiconductor pressure sensing element 26 is attached on the mounting bed 25 with its pressure receiving surface 28 away from the mounting bed 25 and with the evacuated recess 29 facing the mounting bed 25. Therefore, the bonded surface 27 is pressed against the mounting bed 25 by pressure from the silicone oil 21, so that the bonded surface 27 around the evacuated recess 29 can be made relatively small, enabling that the evacuated recess 29 or the effective pressure sensing area of the pressure sensing element 26 can be made relatively large for an element of a given outer diameter, improving a sensitivity of the pressure sensing element 26.

The reduced-diameter passage 36 serves to significantly reduce the volume of the detection cavity 17 and therefore the volume of the silicone oil 21, which significantly decreases the undesirable increase of the pressure of the silicone oil 21 due to thermal expansion upon temperature increase. In this sense, the thick cylindrical inner portion 12 around the narrow passage 36 serves as means disposed within the detection cavity 17 for decreasing the volume of the dectection cavity 17.

Figure 2:
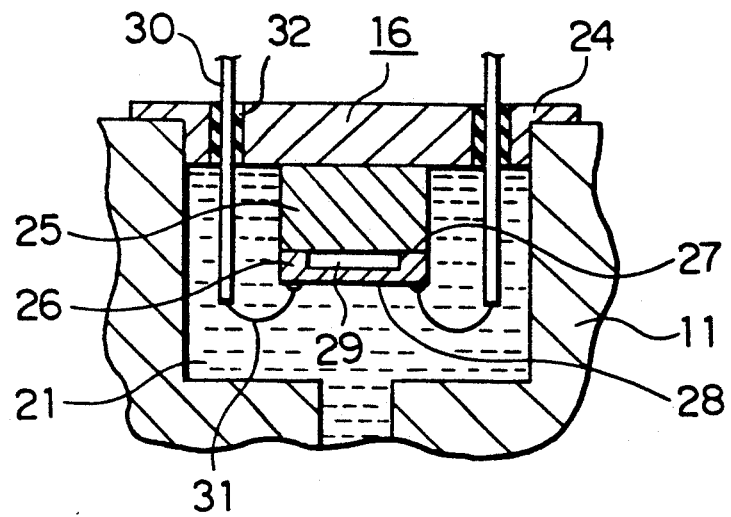
FIG. 2 is an enlarged fragmental sectional view of the semiconductor pressure sensing assembly illustrated in FIG. 1.
Figure 3:
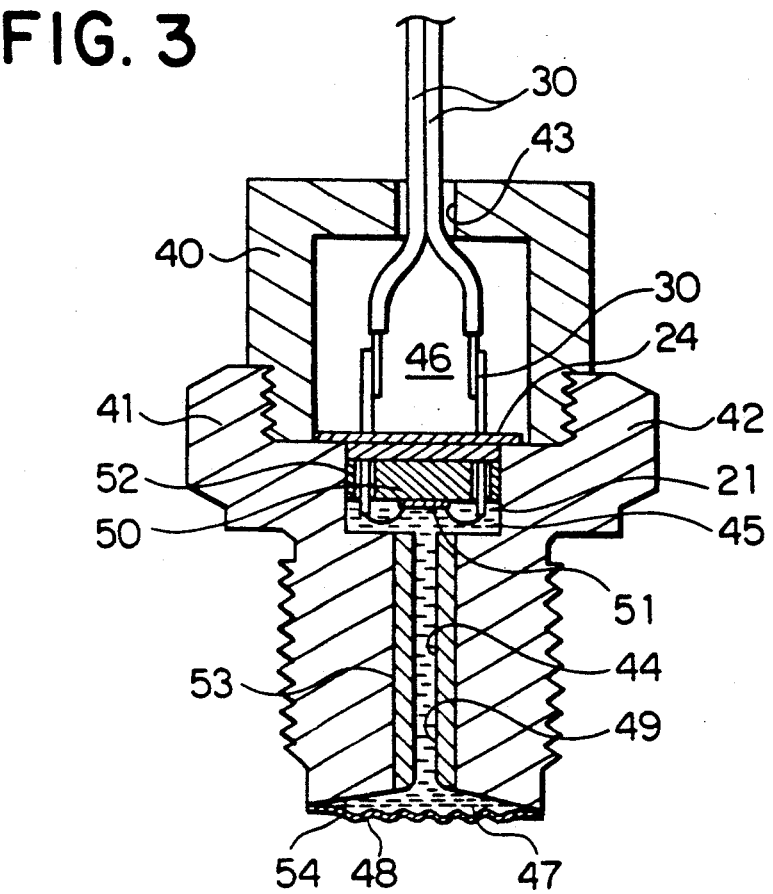
FIG. 3 is a longitudinal sectional view of another embodiment of the pressure sensor of the present invention.

FIG. 3 illustrates another embodiment of the pressure sensor of the present invention, which has basically the same structure as that illustrated in FIGS. 1 and 2 but is different in several points. One of such different structures is a cap member 40 thread-engaged with the cup-shaped outer portion 41 of the main body 42. The cap member 40 has a hole 43 for allowing the signal lines 30 to extend therethrough for external connection. It is also seen that the pressure sensor has a detection cavity 44 having a different configuration. The detection cavity 44 comprises a first chamber 45 in which a pressure sensing assembly 46 is disposed, a second chamber 47 for allowing a flexible diaphragm 48 to flex, and a fluid passage 49 connecting the first and the second chambers 45 and 47. The pressure sensing assembly 46 has a large mounting bed 50 for supporting the semiconductor pressure sensing element 51. The mounting bed 50 fills a substantial part of the first chamber 45 and has a volume sufficient to effectively decrease the volume of the detection cavity 44 which is filled with the pressure transmitting medium 21. The mounting bed 50 has through holes 52 for allowing the signal lines 30 to extend therethrough.

A further difference is that a metallic tube 53 is firmly inserted within a relatively narrow fluid passage 49 formed between the first and the second chambers 45 and 47. The metallic tube 53 may have an outer diameter of about 3 mm and an inner diameter of about 1 mm. The metallic tube 53 is effective to very easily reduce the inner volume of the detection cavity 44 when it is difficult to form a narrow fluid passage 49 in the main body 42 of the pressure sensor.

The second chamber 47 has a detection end 54 or a circumferential edge of the bore, along which the flexible diaphragm 48 is securely attached by welding for example and is bent when the diaphragm 48 is subjected to a pressure. This detection edge 54 is a shallow-slope bevelled edge surface for moderating concentration of bending of the diaphragm 48 and, in the illustrated embodiment, the second chamber 47 is substantially flat cone-shaped. When a pressure is exerted upon the diaphragm 48, it flexes along the slightly sloped surface 54, so that the radius of curvature of the bent portion of the diaphragm 48 is maintained to be large enough. If the diaphragm 48 is bent at a right-angled corner as in the device illustrated in FIG. 1, the bent of the diaphragm 48 occurs repeatedly always at the same position and at a small radius of curvature, so that metal fatigue of the diaphragm 48 can relatively easily occur, decreasing the operational life span of the pressure detector.

Figure 4:
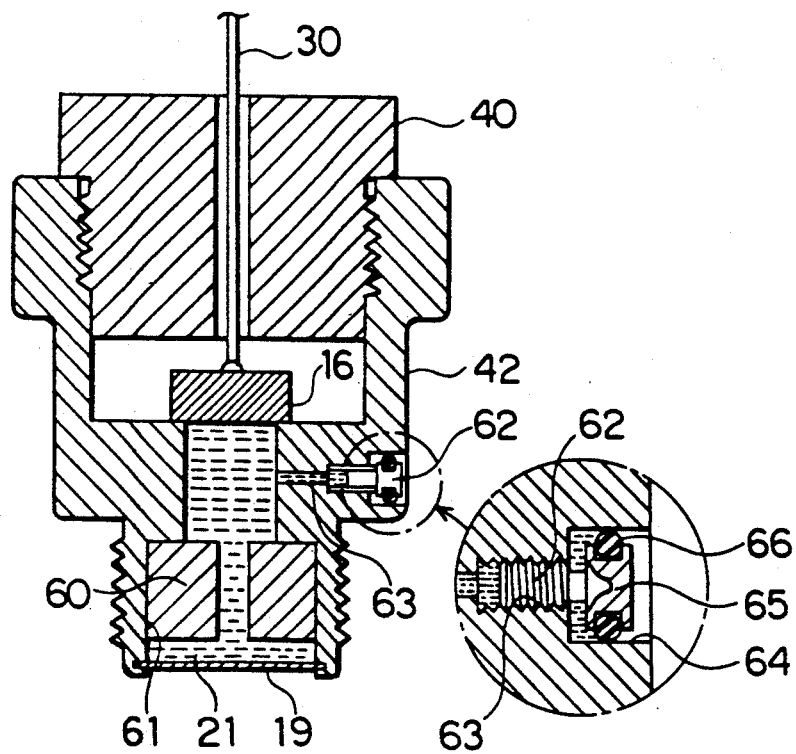
FIG. 4 is a longitudinal sectional view of a still another embodiment of the pressure sensor of the present invention.
Figure 5:
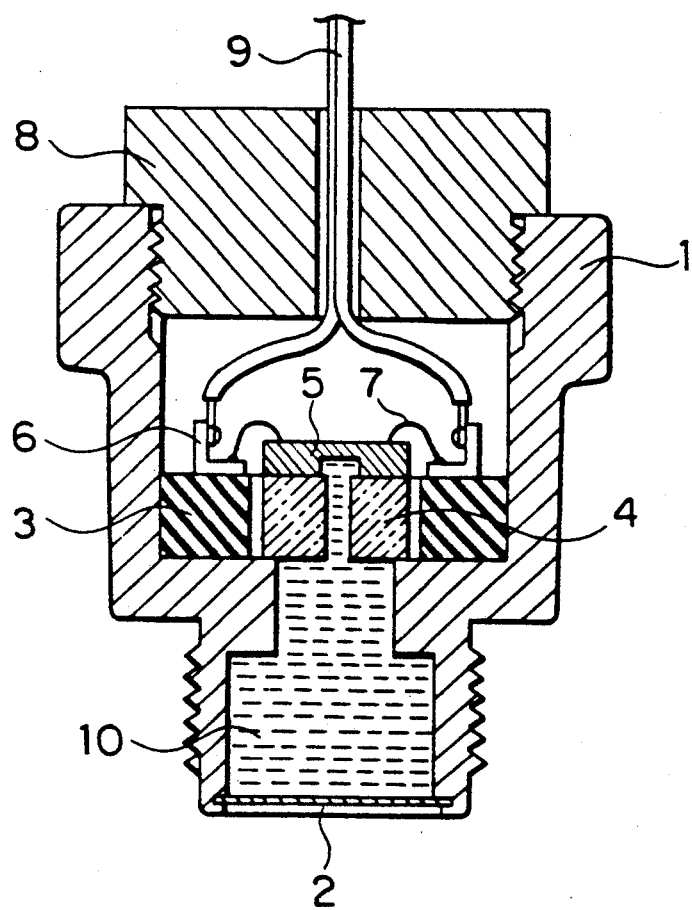
FIG. 5 is a longitudinal sectional view of a conventional pressure sensor.

FIG. 4 illustrates a still another embodiment of the pressure sensor of the present invention in which a ring-shaped spacer 60 made of a thermally-contracting material having a negative coefficient of thermal expansion is mounted within a detection cavity 61 for absorbing thermal expansion of the pressure transmitting medium 21 filled within the detection cavity 61. The thermally-contracting material of the spacer 60 may be an alloy of iron and plutinum. This spacer 60 not only serves as means for reducing the volume of the detection cavity 61, but also serves to compensate for the thermal expansion of the pressure transmitting fluid 21 by absorbing the fluid expansion by the thermal contraction of the thermally contracting spacer 60, so that the fluid pressure can be maintained substantially constant even when the temperature changes, improving the reliability and the accuracy of the pressure sensor.

It is also seen that an adjusting screw 62 is movably disposed in the main body 11 for adjustably changing volume of the dectection cavity 61. The adjusting screw 62 is thread-engaged with a threaded hole 63 formed in a main body 11 for communicating with the detecting cavity 61. The threaded hole 63 includes a large-diameter cylindrical portion 64 concentric with the threaded hole 63, and the adjusting screw 62 includes an adjusting piston 65 slidably engaging the large-diameter cylinder portion 64 through an O-ring 66. By turning the adjusting screw 62, the pressure of the pressure transmitting fluid 21 within the detecting cavity 61 can be adjusted in order to ensure that no undesirable bias pressure is present in the fluid 21, whereby the accuracy and the reliability of the pressure sensor can be improved.

What is claimed is:

1. A pressure sensor comprising:

a hollow main body defining a bore extending therethrough and having a detection end and an output end;

a pressure sensing assembly disposed within said bore of said main body and dividing said bore into a detection cavity including said detection end for transmitting therethrough the pressure to be detected and an output cavity including said output end through which an output signal from said pressure sensing assembly is to be supplied;

a flexible diaphragm attached to said main body at said detection end of said detection cavity for sealing said detection cavity; and a pressure transmitting medium filled within said detection cavity;

said detection end of said bore, along which said flexible diaphragm is bent when it is subjected to a pressure, being substantially cone-shaped to exhibit a shallow slope, bevelled edge surface for moderating concentration of bending of said diaphragm.

2. A pressure detector as claimed in claim 1, wherein said detection cavity has a first chamber for receiving therein said pressure sensing assembly, a second chamber for allowing flexure of said flexible diaphragm in response to pressure acting thereupon, and a reduced diameter fluid passage communicating said first and second chambers.

3. A pressure sensor comprising:
a hollow main body defining a bore extending therethrough and having a detection end and an output end;

a pressure sensing assembly disposed within said bore of said main body and dividing said bore into a detection cavity including said detection end for transmitting therethrough the pressure to be detected and an output cavity including said output end through which an output signal from said pressure sensing assembly is to be supplied;

a flexible diaphragm attached to said main body at said detection end of said detection cavity for sealing said detection cavity;

a pressure transmitting medium filled within said detection cavity; and means disposed within said detection cavity for decreasing the volume of said detection cavity, wherein said means for decreasing volume of said detection cavity comprises a tube inserted within said detection chamber.

4. A pressure sensor as claimed in claim 3, wherein said detection cavity includes a first chamber for receiving therein said pressure sensing assembly, a second chamber for allowing flexure of said flexible diaphragm in response to pressure acting thereupon, and a reduced-diameter passage fluid communicating said first and second chambers, said reduced-diameter passage being defined by said tube.

5. A pressure sensor comprising:
a hollow main body defining a bore extending therethrough and having a detection end and an output end;

a pressure sensing assembly disposed within said bore of said main body and dividing said bore into a detection cavity including said detection end for transmitting therethrough the pressure to be detected and an output cavity including said output end through which an output signal from said pressure sensing assembly is to be supplied;

a pressure transmitting medium filled within said detection cavity; and means disposed within said detection cavity for decreasing the volume of said detection cavity, wherein said means for decreasing the volume of said detection cavity comprises a volume of a thermally-contracting material having a negative coefficient of thermal expansion for absorbing thermal expansion of said pressure transmitting medium, said thermally-contracting material comprising an alloy of iron and platinum.

6. A pressure sensor comprising:
a hollow main body defining a bore extending therethrough and having a detection end and an output end;

a pressure sensing assembly disposed within said bore of said main body and dividing said bore into a detection cavity including said detection end for transmitting therethrough the pressure to be detected and an output cavity including said output end through which an output signal from said pressure sensing assembly is to be supplied;

a flexible diaphragm attached to said main body at said detection end of said detection cavity for sealing said detection cavity;

a pressure transmitting medium filled within said detection cavity; and mechanical adjusting means movably disposed in said main body for mechanically adjusting a volume of said detection cavity to eliminate a bias pressure developed in said pressure transmitting medium.

7. A pressure sensor as claimed in claim 6, wherein said adjusting means comprises a threaded hole formed in a main body and communicating with said detecting cavity and an adjusting screw threadably-engaged with said threaded hole, said adjusting screw changing the axial position thereof in said threaded hole when turned.

8. A pressure sensor as claimed in claim 7, wherein said threaded hole includes a large-diameter cylinder concentric to said threaded hole, and said adjusting screw includes an adjusting piston slidably engaging said large-diameter cylinder.

9. A pressure sensor comprising:
a hollow main body defining a bore extending therethrough and having a detection end and an output end;

a pressure sensing assembly disposed within said bore of said main body and dividing said bore into a detection cavity including said detection end for transmitting therethrough the pressure to be detected and an output cavity including said output end through which an output signal from said pressure sensing assembly is to be supplied;

a flexible diaphragm attached to said main body at said detection end of said detection cavity for sealing said detection cavity;

a pressure transmitting medium filled within said detection cavity; and a ring shaped spacer secured to an interior circumferential wall of said detection cavity for decreasing a volume of said detection cavity, wherein said ring shaped spacer comprises a thermally-contracting material having a negative coefficient of thermal expansion for absorbing thermal expansion of said pressure transmitting medium.

* * * * *